United States Patent [19]
Färjh

[11] Patent Number: 5,978,423
[45] Date of Patent: Nov. 2, 1999

[54] METHOD AND ARRANGEMENT OF SIGNAL TRACKING AND A RAKE-RECEIVER UTILIZING THE ARRANGEMENT

[75] Inventor: Jan Fredrik Färjh, Enskede, Sweden

[73] Assignee: Telefoanktiebolaget LM Ericsson, Stockholm, Sweden

[21] Appl. No.: 08/784,035

[22] Filed: Jan. 15, 1997

Related U.S. Application Data

[60] Provisional application No. 60/011,166, Feb. 5, 1996.

[30] Foreign Application Priority Data

Feb. 2, 1996 [SE] Sweden ................................. 9600394

[51] Int. Cl.$^6$ .............................. H04B 7/10; H04B 7/02; H04B 11/12
[52] U.S. Cl. .......................... 375/347; 375/267; 455/132
[58] Field of Search ..................................... 375/347, 267, 375/355; 455/132, 139, 275.1, 277.1

[56] References Cited

U.S. PATENT DOCUMENTS

| | | | |
|---|---|---|---|
| 5,577,068 | 11/1996 | Bottomley et al. | 375/232 |
| 5,654,980 | 8/1997 | Latva-aho et al. | 375/208 |
| 5,684,793 | 11/1997 | Kiema et al. | 370/335 |
| 5,687,197 | 11/1997 | Powell, II et al. | 375/347 |
| 5,727,032 | 3/1998 | Jamal et al. | 375/347 |

*Primary Examiner*—Chi H. Pham
*Assistant Examiner*—Khai Tran
*Attorney, Agent, or Firm*—Burns, Doane, Swecker & Mathis, L.L.P.

[57] ABSTRACT

The invention relates to a method for tracking closely adjacent and time-shifted signals incoming to a RAKE-receiver (25). According to the method, the sampling positions of the RAKE-branches (25a, 25b) are not permitted to come closer to one another in time than by a predetermined minimum value when updating the branches. The invention also relates to an arrangement (24) for putting the method into effect. The arrangement includes a search unit (24a), a plurality of tracking units (24c, 24d) and a processor unit (24b). The invention also relates to a RAKE-receiver utilizing said apparatus.

16 Claims, 6 Drawing Sheets

METHOD AND ARRANGEMENT OF SIGNAL TRACKING AND A RAKE-RECEIVER UTILIZING THE ARRANGEMENT

This application claims benefit of Provisional Appln. 60/011,166 Feb. 5, 1996.

TECHNICAL FIELD

The present invention relates to a method and an arrangement of tracking signals in a radio receiver and a RAKE-receiver utilizing said apparatus. More specifically, the invention relates to a method and an arrangement of tracking signals that are received by a RAKE-receiver of a CDMA-system in very close time-dispersed relationship, and maintaining the signal sampling positions separated in time.

BACKGROUND OF THE INVENTION

In a mobile radio system, the existance of such signal reflecting surfaces as walls, building structures, hills, mountains etc. are liable to cause the receiver of a radio signal perceiving the signals to be dispersed in time, wherewith signals that carry the same information will arrive at the receiver at different time delays. For instance, the signals received may comprise a strongly dominant signal component, e.g. a direct wave, and weaker reflected signals belonging to the dominant signal component, so-called rays, or a spread of rays of essentially uniform strength. In general, there exists a ray which is stronger than the remaining rays and this ray can then be considered as the main ray.

Time dispersion is generally disadvantageous, since the signals are able to interfere with one another and therewith create interference fading. Time dispersion can, however, also be of benefit. The reflected signals transmit the same information as the main signal. When fading has caused pronounced attenuation of the main signal itself, the main signal can be "reconstructed" or amplified by constructive addition of the time-dispersed rays, i.e. the signal becomes diversity amplified.

A RAKE-receiver is a radio receiver which utilizes this feature of time dispersed signals. The RAKE-receiver includes a plurality of independent receiver units, so-called RAKE-branches, each of which receives and tracks, or locates, a respective ray. The RAKE-receiver also includes means for combining the received signals, and means for delaying these signals so that they will be brought into phase prior to combining the signals. In order to be able to utilize diversity it is necessary to detect a plurality of incoming time-dispersed rays, which places commensurate demands on the resolution sensitivity of the receiver.

Receivers for multi-path spread rays based on the RAKE-principle are known from U.S. Pat. Nos. 5,305,349, and 5,237,586, and from International patent application WO94/28640. These publications describe various ways of combining the received signals to obtain diversity amplified output signals. In the known RAKE-receivers, the RAKE-branches each track respective rays independently of one another. The drawback with the known RAKE-receivers is that when two incoming rays are located so close together that the RAKE-receiver is unsuccessful in resolving the signals, each of the two branches responsible for tracking a respective ray will track one and the same ray, so that one of the rays will not be tracked.

The published patent application GB 2 286 509A describes a method of measuring the impulse response of a received signal in a radio system. The receiver may operate in accordance with the RAKE-principle. The maximum and minimum impulse-response values are measured by a separate receiver and stored in a memory. The time-setting of the branches of the RAKE-receiver are controlled in accordance with the stored values. When the time distance between two mutually adjacent maxima is smaller than a predetermined threshold value, only one of the maximum instants is used to determine the time setting of the branches. The other signal is not then tracked. This is a disadvantage, because the diversity cannot be utilized.

SUMMARY OF THE INVENTION

The present invention is concerned with the problem of how to track time-dispersed rays incoming to a RAKE-receiver in very close succession individually so as to enable frequency diversity to be utilized. When two rays incoming to a RAKE-receiver have very little time dispersion in relation to one another, the receiver may perceive the two rays as being only one single ray. The RAKE-receiver is unable to resolve rays of all incoming densities, meaning that the frequency diversity between the two rays will be lost.

Furthermore, the bit error rate of the receiver output signal will be greater when two incoming rays cannot be separated from one another.

In the earlier known RAKE-receivers, each branch shall endeavour to track its allocated ray irrespective of the sampling positions of the remaining branches. This can result in one or more branches confusing its ray with another ray that arrives at the receiver at almost the same time. This means that certain rays will not be tracked and that the anticipated diversity gain will not be obtained.

One object of the inventive method is thus to control ray tracking in a manner which will avoid losing the tracking of a ray that can contribute to the diversity gain.

According to the present invention, the aforesaid problems are solved by ensuring that the branch sampling positions are not brought too close together when updating, and, if this occurs by forcing the branch sampling positions apart. In this way, frequency diversity between the rays is obtained and the quality of the output signal is improved.

More specifically, the problem is solved by detecting and correlating incoming signals, and initiating the RAKE-receiver branches with appropriate sampling positions when good correlation is obtained. The updating values are determined prior to updating the branch sampling positions. Before actually updating these sampling positions, a check is made to ascertain that the time distance between the sampling position updating values determined with respect to two branches is sufficiently large. If this is not the case, the branches are forced to take sampling positions that are sufficiently separated in time.

The advantage afforded by the inventive method is that rays which arrive at a RAKE-receiver in a very dense sequential relationship can be tracked by maintaining their sampling positions separated in time and therewith enable the frequency diversity between the rays to be utilized.

Another advantage is that the signal quality of the output signals from the RAKE-receiver are improved, because the bit error content of the received baseband signal will be lower than if the inventive method had not been applied.

The invention will now be described in greater detail with reference to preferred exemplifying embodiments thereof and also with reference to the accompanying drawings.

DETAILED DESCRIPTION OF PREFERRED EMBODIMENTS

Figure 1A:
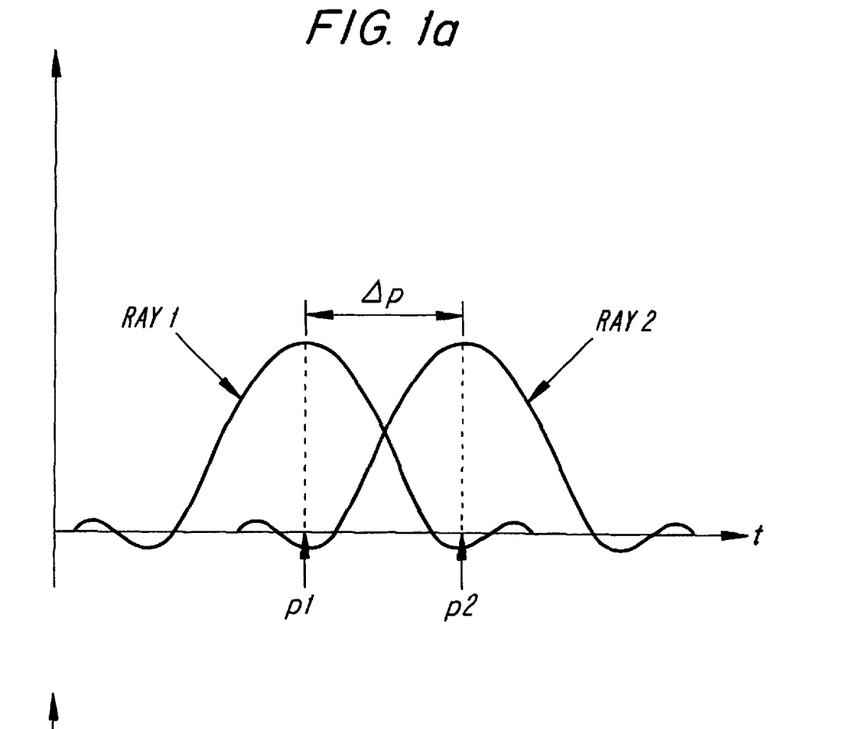
FIGS. 1a and 1b are diagrammatic illustrations of two time-dispersed signals.
Figure 1B:
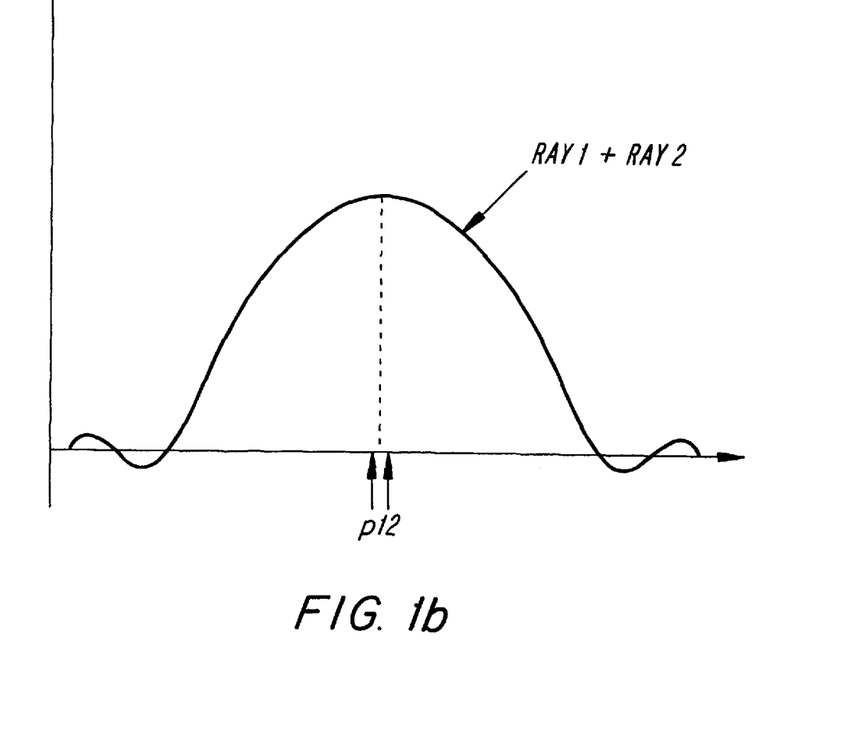

FIGS. 1a–b are diagrams illustrating two rays that have been received by a RAKE-receiver very close together in phase according to a known technique. In the illustrated case, there is no control of the allocated branch sampling positions. Branch 1 of the RAKE-receiver shall track ray 1 and branch 2 shall track ray 2 independently of one another. FIG. 1a shows the two signals and the original branch sampling positions $P_1$ and $P_2$. In the illustrated case, the time distance $\Delta p$ between these positions is too small for the rays to be resolved by the RAKE-receiver. FIG. 1b shows the total signal received in the present case, with ray 1 and ray 2 in phase. Because the two signals appear to be only one signal when received by the receiver, the two signals cannot be resolved in the illustrated case.

If, when updating, the branches are allocated new sampling values according to a so-called early/late-algorithm (described in more detail below), the two signals will be allocated the optimal sampling positions $p_{12}$ corresponding to the peak of the total signal (see the Figure). They will thus adopt the same position and after having taken this position the branches will then both track solely one ray in time. Tracking of the other ray is lost in this case, and therewith the frequency diversity.

The situation would have been different if the same signals, ray 1 and ray 2, had been received just as densely as in the illustrated case but in counterphase. It would then have been possible to distinguish two peaks and therewith enable the two signals to be resolved.

Figure 2:
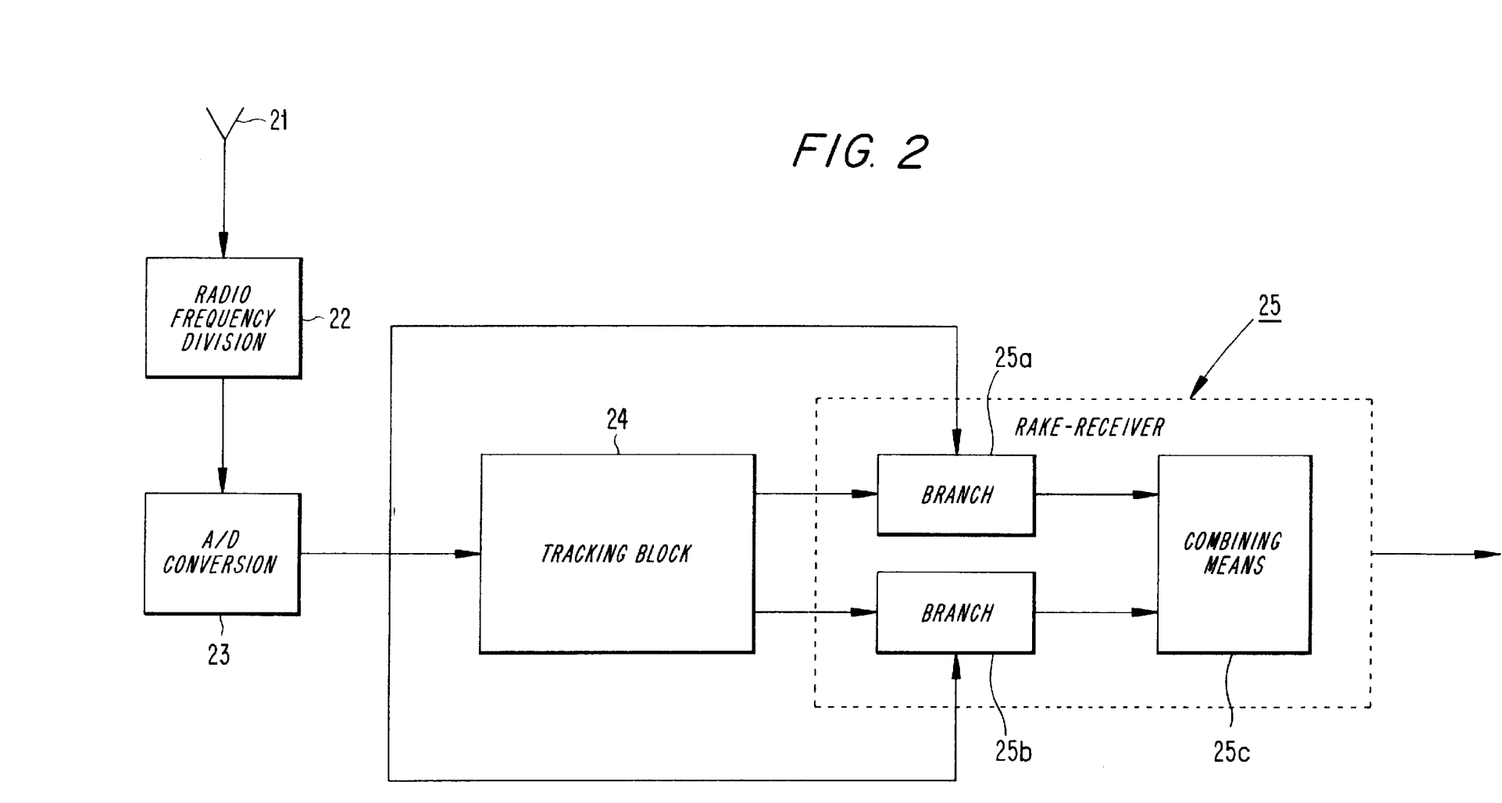
FIG. 2 is a block schematic illustrating part of a CDMA-system including a RAKE-receiver and an inventive arrangement.

FIG. 2 is a block schematic illustrating part of a mobile radio system which includes a RAKE-receiver which utilizes the inventive method. A signal received by an antenna 21 arrives at a tracking block 24, which implements the inventive method, and a RAKE-receiver 25, subsequent to radio frequency division in block 22 and A/D-convertion in block 23. The RAKE-receiver 25 includes a number of receiving units, so-called branches 25a, 25b, and means 25c for combining the branch output signals. When signals arrive at the RAKE-receiver 25 at different arrival times, each of the signals is received separately by respective branches 25a, 25b. The sampling position allocation of the branches is controlled and checked from the tracking block 24, in accordance with the inventive method. The signals from the various RAKE-branches are then combined in the combining means 25c in accordance with a known technique, so as to obtain an output signal for further processing in the CDMA-system.

Figure 3:
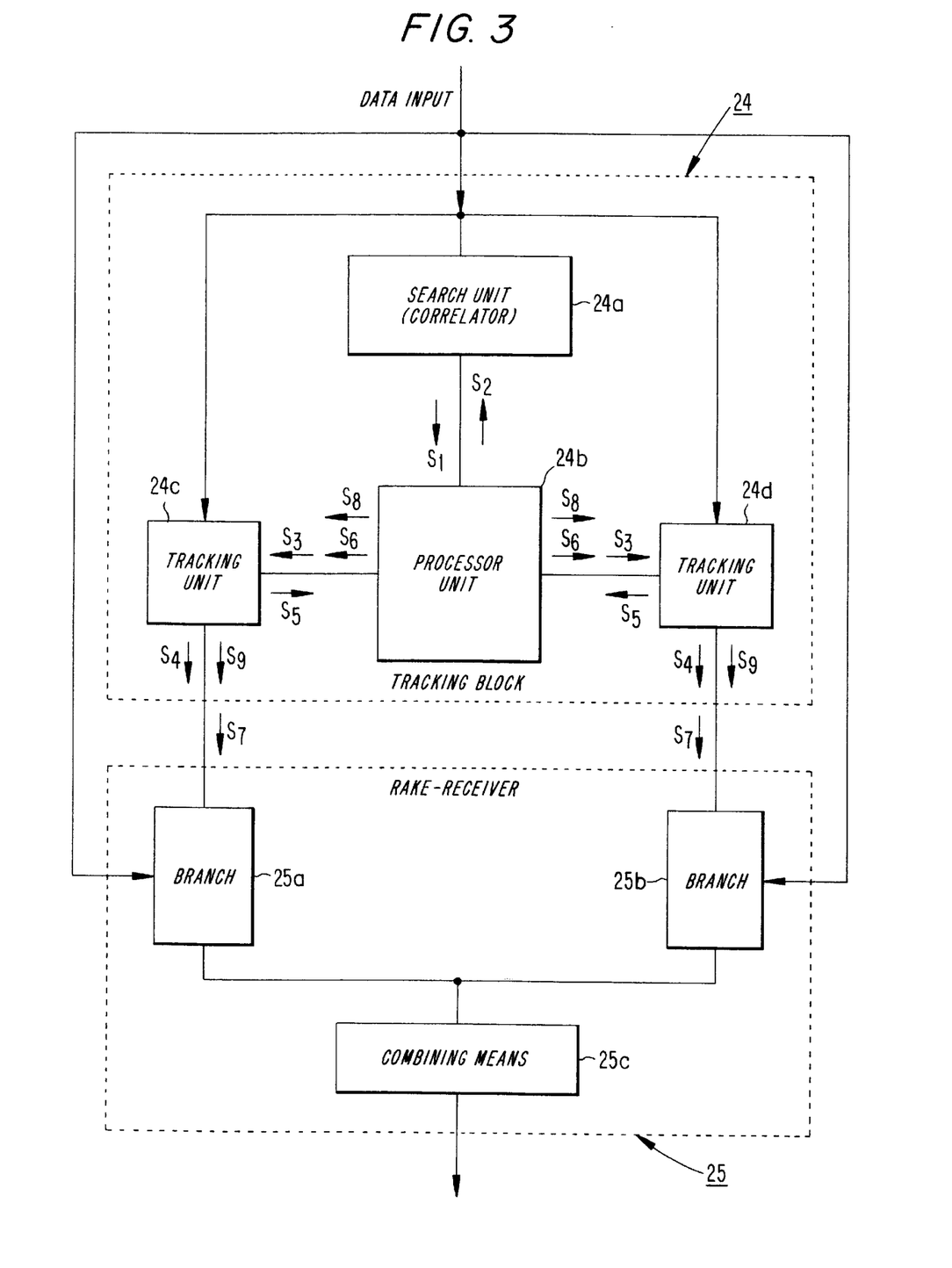
FIG. 3 is a block schematic illustrating an inventive arrangement.

FIG. 3 is a block schematic illustrating the components of the tracking block and shows how said block is connected to the RAKE-branches. The tracking block 24 of FIG. 2 and illustrated in FIG. 3 includes a search unit 24a, a processor unit 24b and two tracking units 24c and 24d. These units are mutually connected by means of two-directional bus connections with the signal flows $S_1$–$S_9$ illustrated in FIG. 3 and described in more detail below.

The search unit 24a and the two tracking units 24c, 24d are comprised of signal processors. In particular, the search unit 24a is a correlator which correlates an incoming signal with a code sequence known in the receiver for detecting correct signals incoming to the RAKE-receiver. The search unit 24a and the two tracking units 24c and 24d are controlled by an algorithm from the process unit 24b, as described in more detail below.

Although the tracking block 24 has been shown divided in FIG. 3 into the aforesaid units, inorder to improve clarity, it will be unterstood that the tracking block 24 may be designed as one single integrated circuit (ASIC). The arrangement may also include more than one search unit. These search units then search at different time intervals, to increase the speed of the search.

As shown in FIG. 3, the RAKE-receiver 25 of FIG. 2 includes the two branches 25a and 25b and the combining means 25c. Each of the branches 25a and 25b is connected to a respective tracking unit 24c and 24d, and the combining means 25c is connected to a downstream unit in the CDMA-system (not shown).

As before described, a multi-path spread signal is comprised of a number of mutually time-shifted rays, wherein the ray that is received first and has travelled the shortest path to the receiver can be considered as being the main ray. The main ray may be the direct ray that has not been spread, or a ray that has been spread by some form of object when the direct ray has been attenuated out. The first incoming signal having a signal strength which exceeds a predetermined minimum strength $M_{min}$, is received by the search unit 24a in the tracking block 24. The search unit 24a searches for a time interval within which one or more echoes (rays) of the main ray can be expected to be found.

The search unit 24a correlates input data with the correct code sequency at different time points, and a signal peak is obtained when a signal is found. Otherwise only noise is obtained. A decision that the correct signal has been received is made by the processor unit 24b on the basis of information, signal $S_1$, derived from the correlation in the search unit 24a. The processor unit 24b then informs the search unit 24a of its decision, signal $S_1$, and the search unit 24a continues to search for more rays. The search unit 24c or 24d functions to provide a branch 25a, 25b with its sampling positions, and if the correlation is good indicating that a ray has been found, tracking of the signal is commenced by virtue of the processor unit 24b initiating the tracking unit with sampling start positions, signal $S_3$. The tracking units 24c and 24d then command their respective branches 25a and 25b, signal $S_4$, to sample the first values at their start positions.

Before each updating of the sampling position of its branches 25a or 25b, a tracking unit 24c or 24d will first determine the best sampling value around the signal peak of the signal to be tracked. In the illustrated case, it is assumed that the search unit 24a finds two rays and that, accordingly, the processor unit 24b initiates both tracking units 24c, 24d with appropriate sampling positions for the two branches 25a and 25b respectively.

Figure 4A:
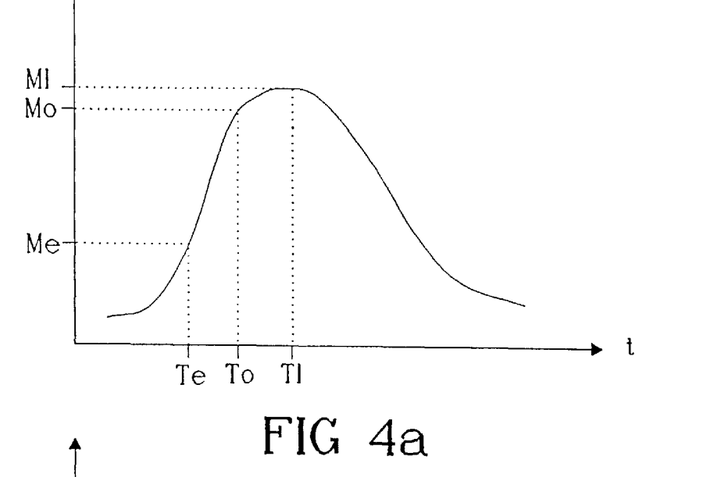
FIGS. 4a–c are diagrams of the so-called early/late-algorithm used when applying the inventive method.
Figure 4B:
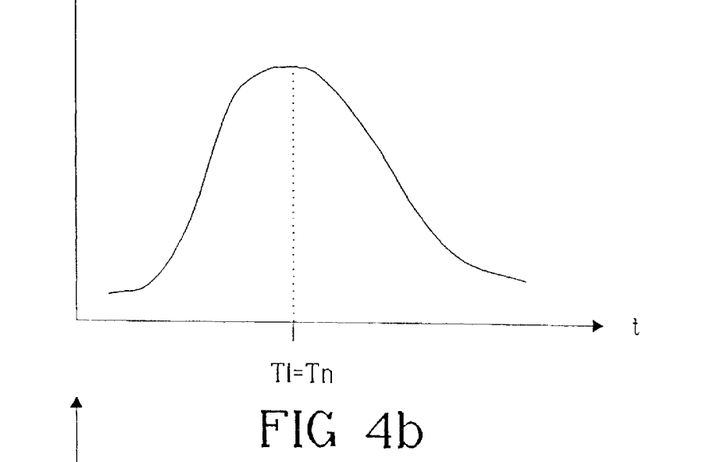
Figure 4C:
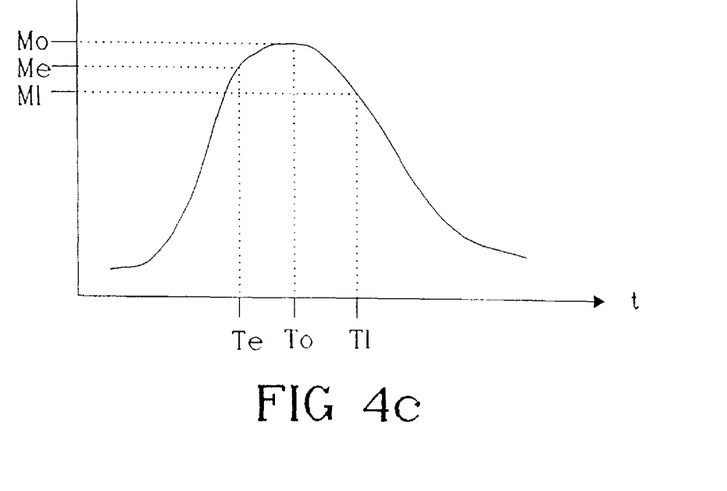

Before updating the sampling positions of the branches 25a, 25b, the tracking units 24c, 24d determine the updating values of sampling positions according to an early/late-algorithm illustrated in FIGS. 4a–c. This algorithm is stored in the tracking units 24c and 24d. The signal strength is determined at two different positions, firstly in a position earlier than the sampling positions concerned and secondly in a position later than said sampling position.

In FIG. 4a, the earlier position is referenced $T_e$, the current or prevailing position is referenced $T_o$ and the later position is referenced $T_1$. The strength of the signal at these time points is referenced $M_e$, $M_o$ and $M_1$ respectively. The sampling position updating value is determined as the position in which the strongest signal strength is measured. When the strongest signal strength is measured in the current sampling position $T_o$, this position is maintained until the next updating occasion when the same procedure is carried out. This case is shown in FIG. 4c. In other cases, the sampling position is moved either to the position $T_e$ or the position $T_1$ in which the strongest signal strength is measured. In the case of the FIG. 4a illustration, the strongest signal strength is measured in the later position $T_1$ and consequently the updating value of the sampling position $T_n$ is in this case shifted to the later position $T_1$, as shown in FIG. 4b. The updating values for the sampling positions $T_1$ and $T_2$ for the two branches 25a and 25b are determined in this way.

Before actually updating the sampling positions of the branches 25a, 25b with the updating values $T_1$ and $T_2$ determined by the early/late-algorithm, the processor unit 24b is informed by the tracking units 24c and 24d of the result of the performed early/late-algorithm signal $S_5$. The processor unit compares the time difference between the two updating values of sampling positions $|T_1-T_2|$ determined for the two branches with a predetermined minimum distance $T_{min}$.

When the time difference between the determined sampling-position updating values is greater than the minimum distance, the processor unit 24b informs the tracking units 24c and 24d that the determined updating values are acceptable, signal $S_6$. The tracking units 24c, 24d then update the branches 25a, 25b with the determined updating values $T_1$, $T_2$, signal $S_7$.

On the other hand, if the time difference is smaller than the minimum distance $T_{min}$, the processor unit 24b forces at least one tracking unit 24c, 24d to move its specified sampling position updating value so that the difference will thereafter exceed the minimum distance $T_{min}$, signal $S_8$. The specified sampling position updating values can be separated in accordance with any one of the following three strategies which involve respectively:
1. Mutually separating both updating values so as to obtain two new updating values.
2. Moving the sampling position updating value for the branch that tracks the weakest signal away from the sampling position updating value for the strongest signal, which is maintained and unchanged. Thus, in this case, a new sampling position updating value is determined for the weakest signal.
3. Moving the sampling position updating value for the branch that tracks the strongest signal away from the sampling position updating value for the weakest signal, which is retained unchanged. Thus, in this case a new sampling position updating value is determined for the strongest signal.

Figure 5A:
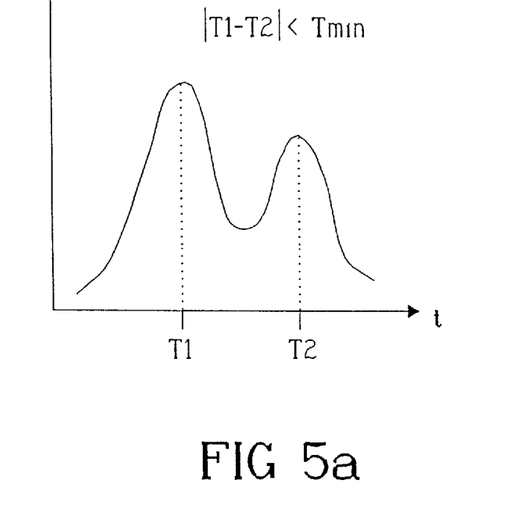
FIGS. 5a–d illustrate three separating strategies applied when using the inventive method.
Figure 5B:
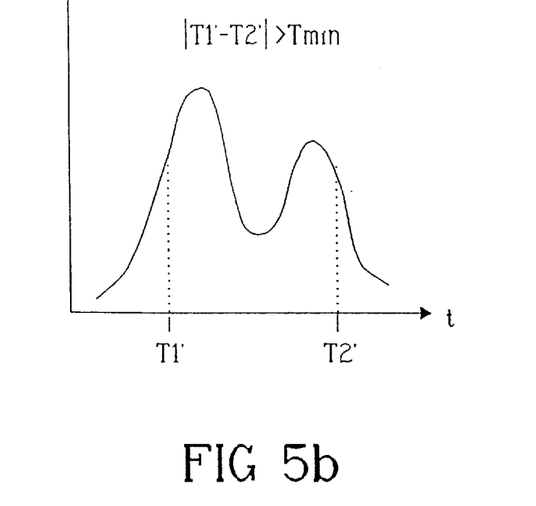
Figure 5C:
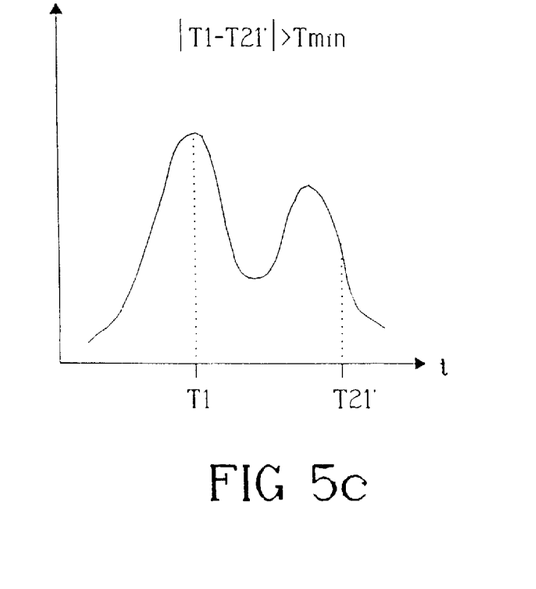
Figure 5D:
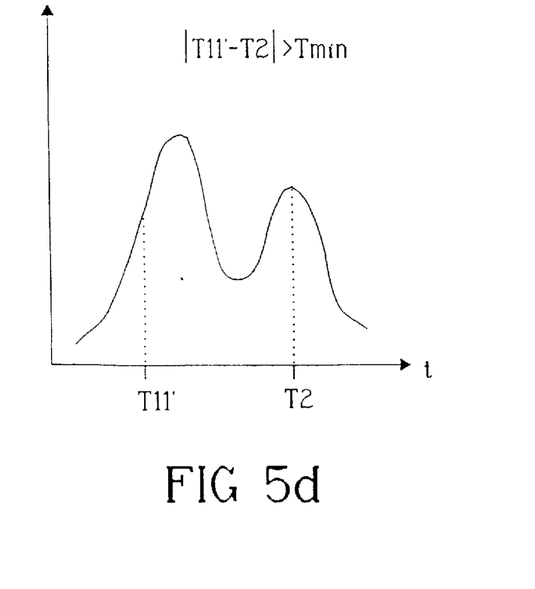

FIGS. 5a–5d illustrate the different strategies for mutually separating the updating values of sampling positions. FIG. 5a shows the optimal sampling positions $T_1$ and $T_2$. In this case, the first branch 25a tracks the strongest signal and the second branch 25b tracks the weakest signal. Strategy 1 is shown in FIG. 5b, with which two new sampling position $T_1'$ and $T_2'$ are determined. FIG. 5c shows strategy 2 wherewith there is determined a new sampling position $T_{21}'$ for the second branch 25b which tracks the weakest signal. FIG. 5d shows the third strategy wherewith the sampling position for the first branch 25a that tracks the strongest signal is moved to position $T_{11}'$.

After separating the updating positions, the signal strength is checked at the new updating value or values of the sampling positions $T_1'$, $T_2'$, $T_{12}'$, $T_{21}'$. If the signal strength $M_1'$, $M_2'$, $M_{12}'$, $M_{21}'$ at one position is below the predetermined minimum strength $M_{min}$, the current or prevailing sampling positions are retained until the next updating occasion. If the signal strength exceeds the minimum strength in both of the sampling positions, the branches are updated with the sampling position updating values determined in accordance with one of the aforesaid strategies, signal $S_9$.

The three strategies imply that the signal will not be sampled in the optimal sampling position if this would result in the branches being position too close together. Although this will result in a somewhat poorer signal value than is optimal, frequency diversity is gained instead of losing the tracking of a signal. The updating procedure is carried out continuously during a signal tracking process.

In the aforedescribed embodiment, two rays are received by two branches. It will be understood, however, that the inventive method and inventive arrangement also function in the aforedescribed manner when more than two rays are received. For instance, when three rays are found by the search unit, three tracking units will provide three branches with appropriate sampling positions. In this case, the strategies applied in mutually separating branches that lie closely adjacent one another will be slightly different than in the case of two branches. In this case, the sampling positions of the first and the second branches cannot simply be compared with one another and the sampling position of the second branch then compared with the sampling positions of the third branch. Such a comparison procedure may result in the sampling position of the second branch being moved forwards and backwards. It is therefore necessary to check both time distances independently of one another. One strategy is never to move the second branch, but only the first and the third branches if so required.

Figure 6:
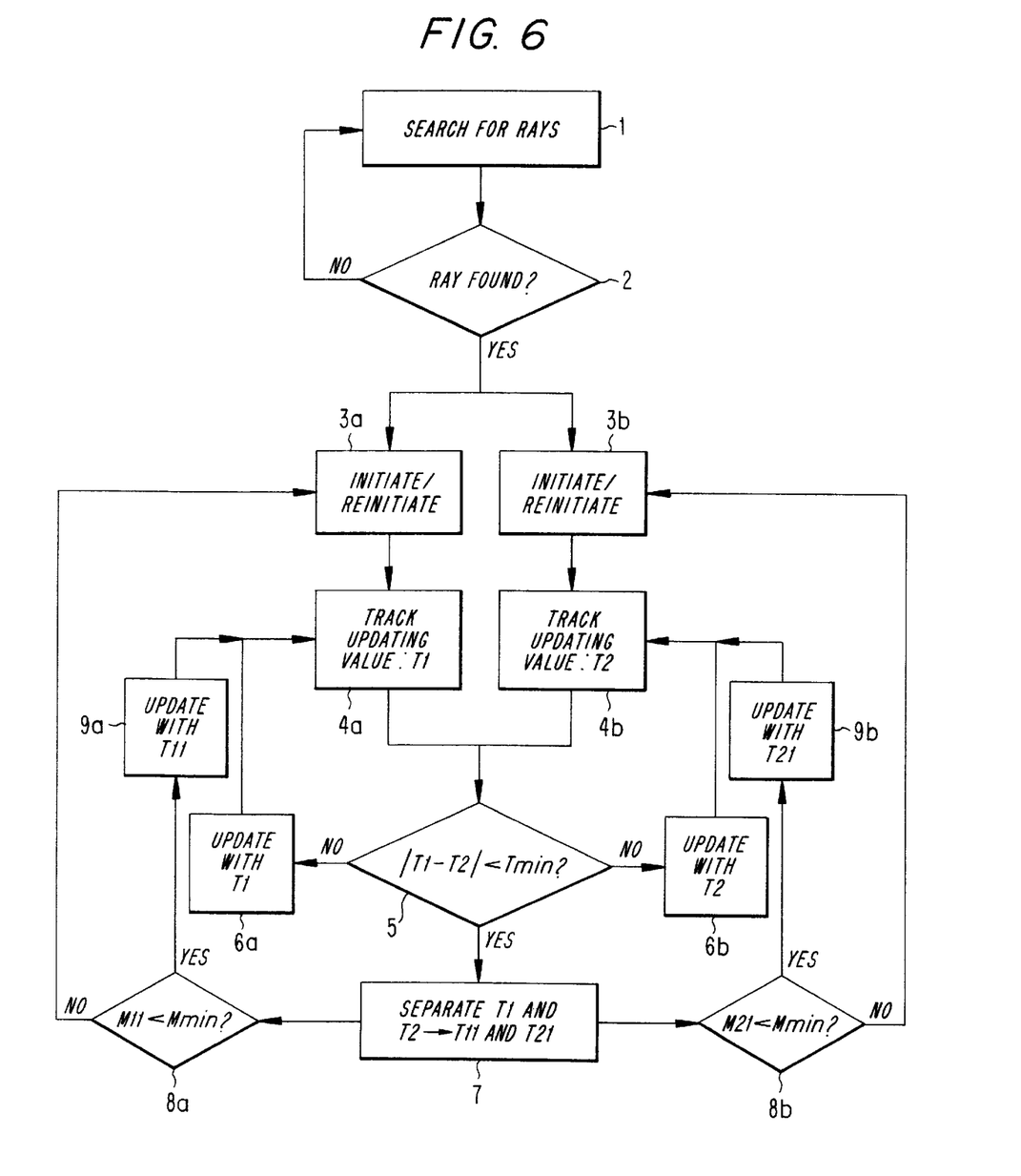
FIG. 6 is a flowchart illustrating the inventive method.

FIG. 6 illustrates the different steps of an inventive method when two rays are found. Incoming signals are detected in step 1, and whether or not a ray has been found is determined in step 2, by correlating received input data at different time points, step 2. If the correlation is poor (no in step 2), the search for rays is continued. If the correlation is judged to be good (yes in step 2), a ray has been found. In step 3a, tracking of the rays is commenced, by initiating a branch with a suitable sampling position start value.

In the case illustrated in FIG. 6, there is found a further ray which passes through steps 1 and 2 in accordance with the aforegoing. Another branch is then allocated to search for this ray, and accordingly this branch is initiated with an appropriate sampling position start value for tracking this further ray, step 3b. A sampling position updating value is determined in accordance with the earlier described early/late-algorithm, steps 4a and 4b, prior to updating the current sampling positions of the branches. This is effected by determining the signal strength in an early position upstream of the current sampling position and in a late position downstream of said current sampling position. When the signal strength in the current position is the greatest strength, this position is retained until the next updating occasion. If the signal strength is greatest in the early position, the new sampling position updating value is determined as this value. If, instead, the signal strength is greatest in the later position, this position becomes the new updating position. The updating values of the sampling positions T1 and T2 for both branches are determined in this way.

Prior to updating with the updating values determined by the early/late-algorithm, a check is made to ascertain that these values are sufficiently spaced in time. This check is carried out by comparing the time difference between the determined updating positions ($T_1-T_2$) with a predetermined smallest distance $T_{min}$, step 5. If the time difference is greater than the smallest permitted distance, (no in step 5), the branches are updated with the determined sampling positions $T_1$ and $T_2$, step 6a and 6b. If the time difference is smaller (yes in step 5), at least one updating value is moved to another sampling position, so that the distance between the thus determined positions is greater than the smallest permitted distance, step 7.

Separation of the sampling position updating values is effected in accordance with one of the earlier described separation strategies. A check is then made to ascertain whether or not the signal strength at the position that has been moved is higher than the lowest permitted signal strength $M_{min}$, steps 8a and 8b. If the signal strength is too low (no in steps 8a and 8b), the current sampling positions are retained until the next updating occasion. If the signal strength is acceptable, (yes in steps 8a and 8b), the branches are updated with the sampling positions determined in step 7, steps 9a and 9b.

As beforementioned, the method can be applied with more than two incoming time-shifted signals. According to simulations, a suitable minimum distance $T_{min}$ may be of the order of one chip duration. When practicing earlier known techniques, the RAKE-receiver has been unable to resolve signals that follow one another at such densities, and hence frequency diversity has been lost. The inventive method thus improves the quality of the received baseband signal.

I claim:

1. A method of tracking signals incoming to a radio receiver each including a main ray and a plurality of rays that are time-shifted in relation to the main ray, comprising the steps of:

searching for signals;
   detecting at least two rays which carry the same information and which arrive at the receiver in time shifted relationship with one another;
   initiating separate tracking of each of the detected rays;
   determining a respective updating value of a sampling position for each tracked ray;
   determining a time difference between two mutually adjacent sampling position updating values;
   comparing said time difference with a predetermined minimum value; and
   changing at least one of said updating values in accordance with said time difference, so that the time difference between the sampling positions will thereafter be greater than the minimum value.

2. A method according to claim 1, further comprising continuously updating said updating values.

3. A method according to claim 1 wherein determination of a respective updating value includes calculating a signal strength in a current sampling position of a tracked ray and in two separated sampling positions of which one sampling position is earlier than a current value of the current sampling position and the other sampling position is later than the current value of the current sampling position; and the updating value is determined as that position of the current sampling position, the one sampling position, or the other sampling position in which the best signal strength has been obtained.

4. A method according to claim 3, further comprising updating with the determined updating values of sampling positions when the time difference between these updating values is greater than the predetermined minimum value.

5. A method according to claim 1 further comprising changing at least one of said updating values when the time difference between the determined updating value is smaller than the predetermined minimum value.

6. A method according to claim 5, further comprising determining new updating values for both rays when the updating values of the sampling positions lie closer together in time than the predetermined minimum value, so that the time difference between the new updating values is greater than the predetermined minimum value.

7. A method according to claim 5, further comprising determining a new updating value of the sampling position for the weakest ray when the updating values lie closer together in time than the predetermined minimum value, so that the time difference between the new updating value for the weakest ray and the updating value for the strongest ray will be greater than the predetermined minimum value.

8. A method according to claim 5, further comprising determining a new updating value of the sampling position for the strongest ray when the time difference between the updating values of sampling positions lie closer to one another in time than the predetermining minimum value, so that the time difference between the new updating value for the strongest ray and the updating value for the weakest ray will be greater than the predetermined minimum value.

9. A method according to claim 5 further comprising:
   calculating the signal strength at the new updating values of sampling positions;
   comparing said signal strength with a predetermined minimum strength;
   reinitiating with the current values of the sampling positions when the signal strength is smaller than the minimum signal strength; and
   updating the sampling positions with the determined updating values when the signal strength is greater than the predetermined minimum strength.

10. A method according to claim 1 wherein the predetermined minimum value is one chip duration.

11. An arrangement for tracking rays incoming to a radio receiver, comprising:
    at least one search unit which functions to search input data within a given time interval and to correlate the received input data at different time points;
    a plurality of tracking units which function to determine updating values for current sampling positions and to continuously update current sampling values;
    a processor unit, which operates:
    a) to decide whether the correlation of the input data indicates that a ray has been found, wherein the search unit is ordered to continue its search for incoming rays when the correlation is indicates that a ray has not been found, and a tracking unit is initiated with a sampling position start value when the correlation is indicates that a ray has been found;
    b) to determine a time difference between two mutually adjacent updating values of sampling positions, wherein said time difference is compared with a predetermined minimum distance, and wherein at least one of the tracking units is ordered to shift its sampling position updating value when said time difference is smaller than the predetermined minimum value; and c) to check that a signal strength in each determined updating position is greater than a predetermined minimum strength.

12. An arrangement according to claim 11, wherein the search unit includes a signal processor and a plurality of correlators.

13. An arrangement according to claim 11, wherein the tracking unit includes a signal processor.

14. An arrangement according to claim 11, wherein the search unit and the tracking units are connected to the processor unit by means of two-directional bus connections.

15. A RAKE-receiver which utilizes the arrangement according to claim 11, comprising:

a plurality of free-standing RAKE-branches, wherein each branch is connected to a respective tracking unit; and wherein the allocation of sampling position updating values to the branches is controlled by the tracking units.

16. An apparatus for tracking time dispersed rays comprising:

means for detecting a first and a second time dispersed ray;

means for determining a first sampling position updating value for said first ray;

means for determining a second sampling position updating value for said second ray;

means for determining a time difference between said first and said second sampling position updating values; and means for changing at least one of said first or said second sampling position updating values when said time difference is less than a predetermined minimum value.

* * * * *